(12) United States Patent
Ueno (10) Patent No.: US 11,136,982 B2
(45) Date of Patent: Oct. 5, 2021

(54) SCREW COMPRESSOR

(71) Applicant: DAIKIN INDUSTRIES, LTD., Osaka (JP)

(72) Inventor: Hiromichi Ueno, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 195 days.

(21) Appl. No.: 16/309,793

(22) PCT Filed: Jun. 9, 2017

(86) PCT No.: PCT/JP2017/021528
§ 371 (c)(1),
(2) Date: Dec. 13, 2018

(87) PCT Pub. No.: WO2017/217341
PCT Pub. Date: Dec. 21, 2017

(65) Prior Publication Data
US 2019/0120232 A1    Apr. 25, 2019

(30) Foreign Application Priority Data

Jun. 14, 2016 (JP) .............................. JP2016-117678

(51) Int. Cl.
| F04C 29/06 | (2006.01) |
| F04C 18/52 | (2006.01) |
| F01C 21/02 | (2006.01) |
| F16C 19/14 | (2006.01) |

(52) U.S. Cl.
CPC ............ *F04C 29/065* (2013.01); *F04C 18/52* (2013.01); *F04C 29/068* (2013.01); *F01C 21/02* (2013.01);
(Continued)

(58) Field of Classification Search
CPC ...... F04C 29/065; F04C 29/068; F04C 18/52; F04C 18/50; F04C 2240/56; F04C 2240/50; F04C 2240/45; F16C 19/14; F01C 21/02
See application file for complete search history.

(56) References Cited

U.S. PATENT DOCUMENTS

| 6,217,304 B1 * | 4/2001 | Shaw ..................... F04C 18/084 |
| | | 418/100 |
| 2010/0183468 A1 * | 7/2010 | Hossain .................. F04C 18/52 |
| | | 418/201.1 |

(Continued)

FOREIGN PATENT DOCUMENTS

| EP | 2 634 432 A1 | 9/2013 |
| JP | 56-54987 A | 5/1981 |

(Continued)

OTHER PUBLICATIONS

JP2004324601 translation (Year: 2020).*
(Continued)

*Primary Examiner* — Devon C Kramer
*Assistant Examiner* — David N Brandt
(74) *Attorney, Agent, or Firm* — Global IP Counselors, LLP (57) ABSTRACT

A screw compressor includes a casing, a screw rotor, a discharge passage, and at least one muffler space. The casing includes a cylindrically-shaped cylinder, a main body surrounding a vicinity of the cylinder, and a high-pressure fluid passage provided between the main body and the cylinder. The screw rotor includes a plurality of helical grooves. The screw rotor is inserted into the cylinder to define fluid chambers. A fluid is sucked into the fluid chambers to compress the fluid. The discharge passage is disposed in the casing. The discharge passage guides the fluid that has been discharged from the fluid chambers to the high-pressure (Continued)

fluid passage. The at least one muffler space is disposed in the casing. The at least one muffler space communicates with the discharge passage so as to reduce a pressure fluctuation of the fluid flowing from the discharge passage to the high-pressure fluid passage.

5 Claims, 11 Drawing Sheets

(52) U.S. Cl.
 CPC ...... *F04C 2240/45* (2013.01); *F04C 2240/56* (2013.01); *F16C 19/14* (2013.01)

(56) References Cited

U.S. PATENT DOCUMENTS

| | | | |
|---|---|---|---|
| 2012/0017634 A1 | 1/2012 | Dorman et al. | |
| 2013/0216418 A1* | 8/2013 | Masuda | ................ F04C 29/068 418/191 |
| 2016/0347120 A1* | 12/2016 | Barberis | ............. F16C 33/7826 |

FOREIGN PATENT DOCUMENTS

| | | | |
|---|---|---|---|
| JP | 2001-6548 A | 1/2001 | |
| JP | 2004-316586 A | 11/2004 | |
| JP | 2004-324601 A | 11/2004 | |
| JP | 2004324601 | * 11/2004 | .............. F04C 18/16 |
| JP | 2012-102706 A | 5/2012 | |

OTHER PUBLICATIONS

International Preliminary Report of corresponding PCT Application No. PCT/JP2017/021528 dated Dec. 27, 2018.
International Search Report of corresponding PCT Application No. PCT/JP2017/021528 dated Aug. 29, 2017.
European Search Report of corresponding EP Application No. 17 81 3238.7 dated Nov. 20, 2019.

* cited by examiner

SCREW COMPRESSOR

CROSS-REFERENCE TO RELATED APPLICATIONS

This U.S. National stage application claims priority under 35 U.S.C. §119(a) to Japanese Patent Application No. 2016-117678, filed in Japan on June 14, 2016, the entire contents of which are hereby incorporated herein by reference.

TECHNICAL FIELD

The present invention relates to a screw compressor for compressing a fluid.

BACKGROUND ART

Screw compressors have been used as a compressor for compressing a fluid. For example, Japenese Unexamined Patent Publication No. 2001-065481 discloses a single-screw compressor having one screw rotor and two gate rotors.

In the screw compressor disclosed in Japenese Unexamined Patent Publication No. 2001-065481 the screw rotor and the gate rotors are housed in a casing. The screw rotor is inserted into a cylinder formed in the casing. The cylinder is surrounded by a main body of the casing. The screw rotor has a plurality of helical grooves, and the helical grooves define fluid chambers. The casing includes therein a low-pressure space and a high-pressure space. When the screw rotor is driven to rotate using an electric motor, a refrigerant in the low-pressure space is sucked into the fluid chamber. After being compressed in the fluid chamber, the refrigerant is discharged into the high-pressure space.

In the casing of the screw compressor in Japenese Unexamined Patent Publication No. 2001-065481 a high-pressure fluid passage through which a compressed high-pressure fluid flows is formed between the cylinder and the main body. The fluid that has been compressed in the fluid chamber passes through this high-pressure fluid passage, and then, flows into the high-pressure space. The cylinder is heated by a fluid flowing in the high-pressure fluid passage, thereby reducing a temperature difference between the cylinder and the screw rotor. This reduces a thermal expansion difference between the cylinder and the screw rotor during the operation of the screw compressor, thereby providing a gap between the cylinder and the screw rotor.

SUMMARY

The screw rotor has the plurality of helical grooves, and the fluid is sequentially discharged from the fluid chambers defined by the respective helical grooves. Thus, a pressure inside the fluid that has been discharged from the fluid chamber always fluctuates. If the fluid having a pressure that fluctuates relatively significantly passes through the high-pressure fluid passage, the main body of the casing vibrates due to the pressure fluctuation of the fluid, and noise is released from the casing.

The present invention is conceived in view of the above problems, and attempts to reduce noise generated in a screw compressor.

A first aspect of the present disclosure is directed to a screw compressor including: a casing (10) including a cylindrically-shaped cylinder (30), a main body (10a) surrounding a vicinity of the cylinder (30), and a high-pressure fluid passage (61, 64) provided between the main body (10a) and the cylinder (30); and a screw rotor (40) including a plurality of helical grooves (41), and inserted into the cylinder (30) to define fluid chambers (23), the screw compressor sucking a fluid into the fluid chambers (23) to compress the fluid. The screw compressor further includes a discharge passage (26, 27) disposed in the casing (10) and guiding the fluid that has been discharged from the fluid chambers (23) to the high-pressure fluid passage (61, 64), and at least one muffler space (50) disposed in the casing (10), and communicating with the discharge passage (26, 27), thereby reducing a pressure fluctuation of the fluid flowing from the discharge passage (26, 27) to the high-pressure fluid passage (61, 64).

In the first aspect, if the screw rotor (40) rotates, the fluid is sucked into the fluid chambers (23) to be compressed. The fluid that has been compressed in the fluid chambers (23) is discharged from the fluid chambers (23) to the discharge passages (26, 27). Whenever the discharge passages (26, 27) communicates with the fluid chambers (23), the fluid flows from the fluid chambers (23) into the discharge passages (26, 27). That is to say, the fluid that has been compressed in the fluid chambers (23) flows sequentially in the discharge passages (26, 27). Therefore, the pressure of the fluid flowing in the discharge passages (26, 27) fluctuates periodically.

In the first aspect, the fluid that has been discharged from the fluid chambers (23) passes through the discharge passages (26, 27) to flow into the high-pressure fluid passages (61, 64). The discharge passages (26, 27) communicate with the muffler space (50). Therefore, compared with the case where no muffler space (50) is provided, the pressure fluctuation of the fluid flowing in the discharge passages (26, 27) is reduced. Therefore, the fluid of which pressure fluctuation is reduced flows into the high-pressure fluid passages (61, 64) while passing through the discharge passages (26, 27). Thus, this reduces vibration of the main body (10a) of the casing (10) due to the pressure fluctuation of the fluid, and further reduces noise generated due to the operation of the screw compressor (1).

A second aspect of the present disclosure is an embodiment of the first aspect. In the second aspect, the screw compressor further includes a plurality of gate rotors (45, 46) meshing with the respective plurality of helical grooves (41) of the screw rotor (40). The discharge passage (26, 27) includes a plurality of discharge passages (26, 27), and in the casing (10), the discharge passages (26, 27) are formed one-by-one so as to be respectively associated with the gate rotors (45, 46), and all of the discharge passages (26, 27) communicate with a single one of the at least one muffler space (50).

In the screw compressor (1) of the second aspect, the discharge passages (26, 27) are formed one-by-one so as to be respectively associated with the gate rotors (45, 46). For example, in the screw compressor (1) including two gate rotors (45, 46), the fluid is discharged from a fluid chamber (23) defined by the helical groove (41) meshing with a first gate rotor (45) to a first discharge passage (26), and the fluid is discharged from a fluid chamber (23) defined by the helical groove (41) meshing with a second gate rotor (46) to a second discharge passage (27). In this screw compressor (1), all of the discharge passages (26, 27) communicate with a single muffler space (50). Therefore, the pressure fluctuation of the fluid in one of the discharge passages (26, 27) is transmitted to that in the other discharge passage through the muffler space (50).

A third aspect of the present disclosure is an embodiment of the second aspect. In the third aspect, the plurality of the gate rotors (45, 46) include two gate rotors (45, 46), and the plurality of helical grooves (41) include an odd number of helical grooves (41), and the odd number of helical grooves (41) are formed in the screw rotor (40).

In the third aspect, the screw compressor (1) includes two gate rotors (45, 46), and the screw rotor (40) is provided with odd number of helical grooves (41). Therefore, the timing at which the fluid is discharged from the fluid chamber (23) defined by the helical groove (41) meshing with the first gate rotor (45) to the first discharge passage (26) is shifted from the timing at which the fluid is discharged from the fluid chamber (23) defined by the helical groove (41) meshing with the second gate rotor (46) to the second discharge passage (27). Therefore, the waveforms of the pressure fluctuations of the fluid in the first and second discharge passages (26, 27) are shifted from each other by a substantially half-wavelength.

In the third aspect, the first discharge passage (26) and the second discharge passage (27) communicate with one muffler space (50). Therefore, the pressure fluctuation of the fluid in one of the discharge passages (26, 27) is transmitted to that in the other discharge passage through the muffler space (50). As a result, the pressure fluctuations of the fluid in the first and second discharge passages (26, 27) cancel each other.

A fourth aspect of the present disclosure is an embodiment of any one of the first to third aspects. In the fourth aspect, the casing (10) includes a cylindrically-shaped bearing holder (35) holding a bearing (36) supporting a drive shaft (21) of the screw rotor (40), the bearing holder (35) is fitted into an end of the cylinder (30), and has an outer peripheral surface facing an inner peripheral surface of the cylinder (30), and the at least one muffler space (50) is configured as a recessed groove (51, 52) formed in at least one of the outer peripheral surface of the bearing holder (35) or a portion of the inner peripheral surface of the cylinder (30), the portion facing the bearing holder (35).

In the fourth aspect, the recessed groove (51, 52) is formed in at least one of the outer peripheral surface of the bearing holder (35) or the portion, of the inner peripheral surface of the cylinder (30), facing the bearing holder (35). This recessed groove (51, 52) constitutes the muffler space (50). That is to say, in this aspect, the muffler space (50) is defined by the cylinder (30) and the bearing holder (35) which are conventionally provided to the screw compressor (1).

According to the first aspect, the casing (10) is provided with the muffler space (50), reducing the pressure fluctuation of the fluid flowing into the high-pressure fluid passage (61, 64). Therefore, this can reduce vibration of the main body (10a) of the casing (10) due to the pressure fluctuation of the fluid, and further reduce noise generated due to the operation of the screw compressor (1).

In the third aspect, the screw compressor (1) includes two gate rotors (45, 46), and the screw rotor (40) is provided with odd number of helical grooves (41). Therefore, the waveforms of the pressure fluctuations of the fluid in the first and second discharge passages (26, 27) are shifted from each other by a substantially half-wavelength. In this aspect, the first discharge passage (26) and the second discharge passage (7) communicate with one muffler space (50). Therefore, according to this aspect, the pressure fluctuations of the refrigerant in the first and second discharge passages (26, 27) cancel each other. This can reliably reduce the pressure fluctuations of the fluid flowing from the respective discharge passages (26, 27) to the high-pressure fluid passages (61, 64).

According to the fourth aspect, the muffler space (50) is defined by the cylinder (30) and the bearing holder (35) which are conventionally provided to the screw compressor (1). Thus, according to this aspect, the muffler space (50) can be provided to the casing (10) without adding a new member to the screw compressor (1).

DETAILED DESCRIPTION OF EMBODIMENT

Embodiments of the present invention will be described in detail with reference to the drawings. Note that the following embodiments and variations are merely beneficial examples in nature, and are not intended to limit the scope, applications, or use of the invention.

First Embodiment

A first embodiment will be described. A single-screw compressor (1) (hereinafter, simply referred to as "screw compressor") according to this embodiment is provided to a refrigerant circuit of a refrigeration apparatus, and compresses a refrigerant. That is to say, the screw compressor (1) of the embodiment sucks and compresses the refrigerant that is a fluid.

Figure 1:
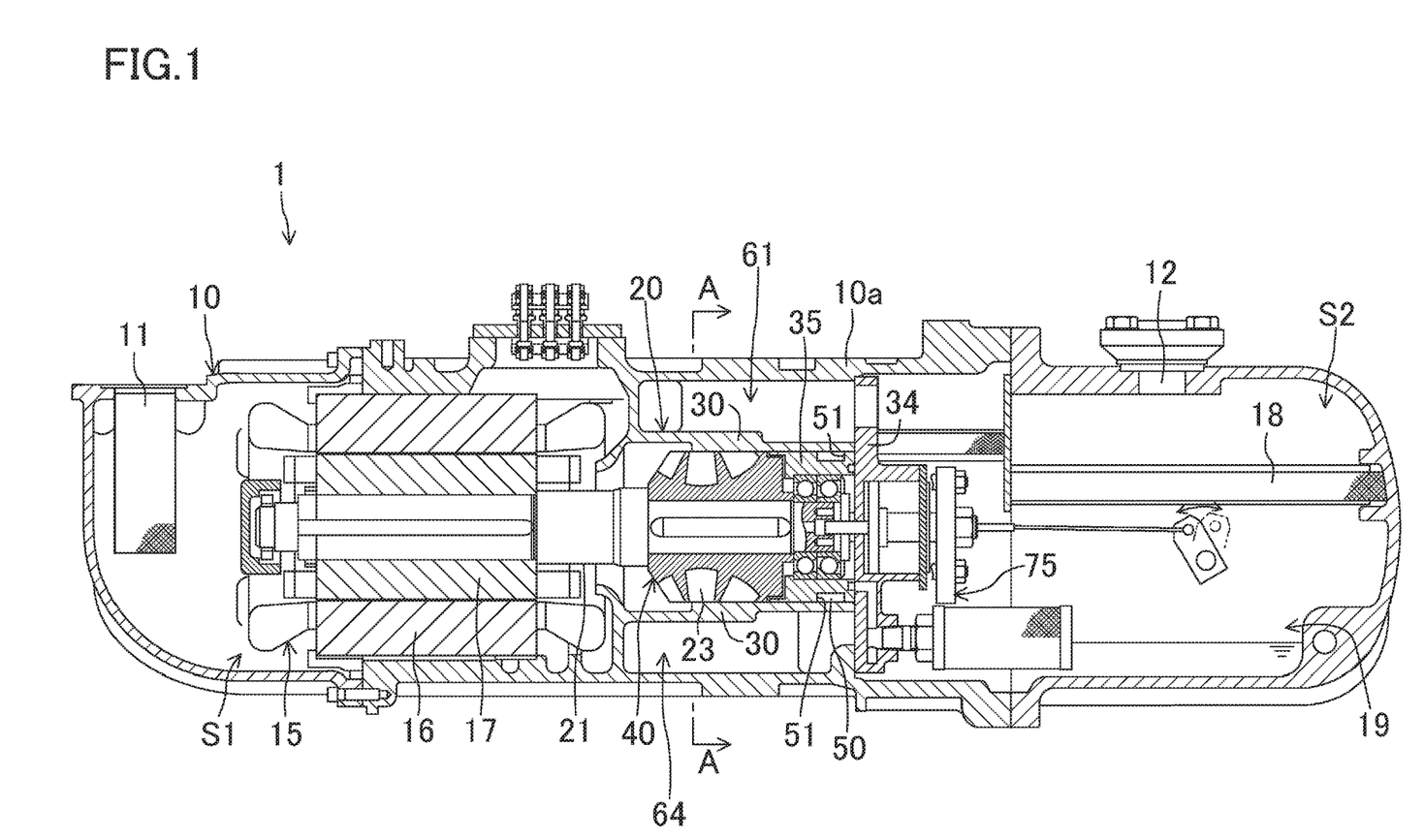
FIG. 1 is a vertical cross-sectional view of a single-screw compressor according to a first embodiment.

As illustrated in FIG. 1, the screw compressor (1) includes, in a single casing (10), a compression mechanism (20) and an electric motor (15) configured to drive the compression mechanism (20). The screw compressor (1) is configured as a semi-hermetic compressor.

The casing (10) includes a main body (10a), a cylinder (30), and a bearing holder (35). Now, the main body (10a) will be described. The cylinder (30) and the bearing holder (35) will be described, later.

The main body (10a) is formed in an oblong cylindrical shape and has closed ends. The internal space of the main body (10a) is partitioned into a low-pressure space (S1) located closer to one end of the main body (10a) and a high-pressure space (S2) located closer to the other end of the main body (10a). The main body (10a) is provided with an inlet (11) communicating with the low-pressure space (S1), and an outlet (12) communicating with the high-pressure space (S2). A low-pressure refrigerant that has flowed from an evaporator of the refrigeration apparatus passes through the inlet (11) into the low-pressure space (S1). A compressed high-pressure refrigerant that has been discharged from the compression mechanism (20) into the high-pressure space (S2) passes through the outlet (12), and then, is supplied to a condenser of the refrigeration apparatus.

In the main body (10a), the electric motor (15) is arranged in the low-pressure space (S1), and the compression mechanism (20) is arranged between the low-pressure space (S1) and the high-pressure space (S2). The electric motor (15) is disposed between the inlet (11) of the main body (10a) and the compression mechanism (20). The electric motor (15) has a stator (16) fixed to the main body (10a). The electric motor (15) has a rotor (17) connected to the drive shaft (21) of the compression mechanism (20). When the electric motor (15) is caused to conduct, the rotator (17) rotates, and the electric motor (15), described later, drives a screw rotor (40) of the compression mechanism (20).

In the main body (10a), an oil separator (18) is arranged in the high-pressure space (S2). The oil separator (18) separates refrigerating machine oil from the high-pressure refrigerant that has been discharged from the compression mechanism (20). In the high-pressure space (S2), an oil reservoir chamber (19) is provided below the oil separator (18) and accumulates the refrigerating machine oil, which serves as lubricating oil. The refrigerating machine oil separated from the refrigerant by the oil separator (18) flows downward to be accumulated in the oil reservoir chamber (19).

As illustrated in FIGS. 1 to 4, the cylinder (30) is formed in a substantially cylindrical shape. This cylinder (30) is disposed in the center portion of the main body (10a) in the longitudinal direction, and is integrally formed with the main body (10a). The inner peripheral surface of the cylinder (30) is a curved surface.

One single-screw rotor (40) is inserted into the cylinder (30). The drive shaft (21) is coaxially connected to the screw rotor (40). The screw rotor (40) meshes with the two gate rotors (45, 46). The screw rotor (40) and the gate rotors (45, 46) constitute the compression mechanism (20). Details of the screw rotor (40) and the gate rotors (45, 46) will be described later.

Figure 3:
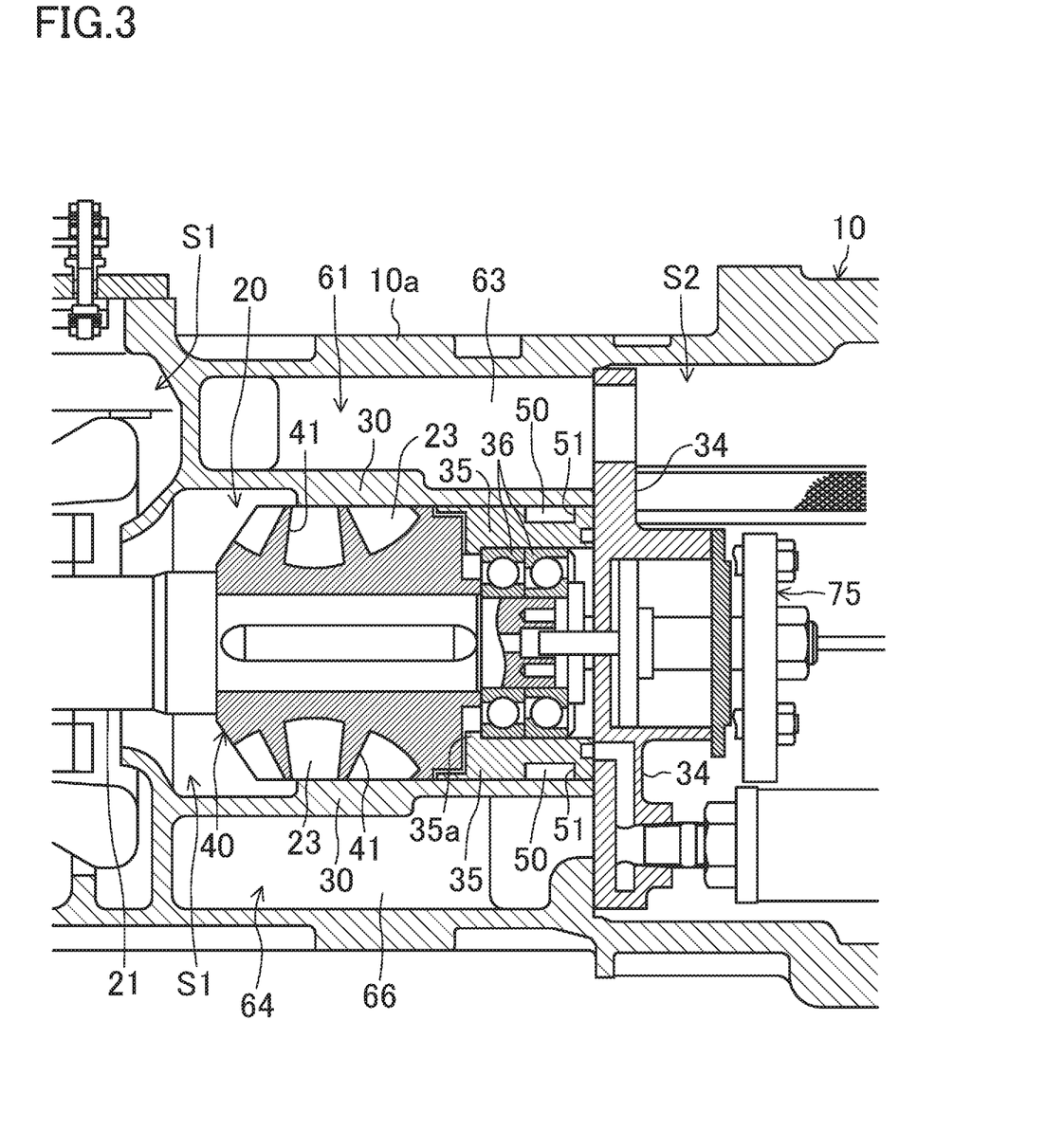
FIG. 3 is a cross-sectional view of a main part of the single-screw compressor, taken along line B-B of FIG. 2.
Figure 4:
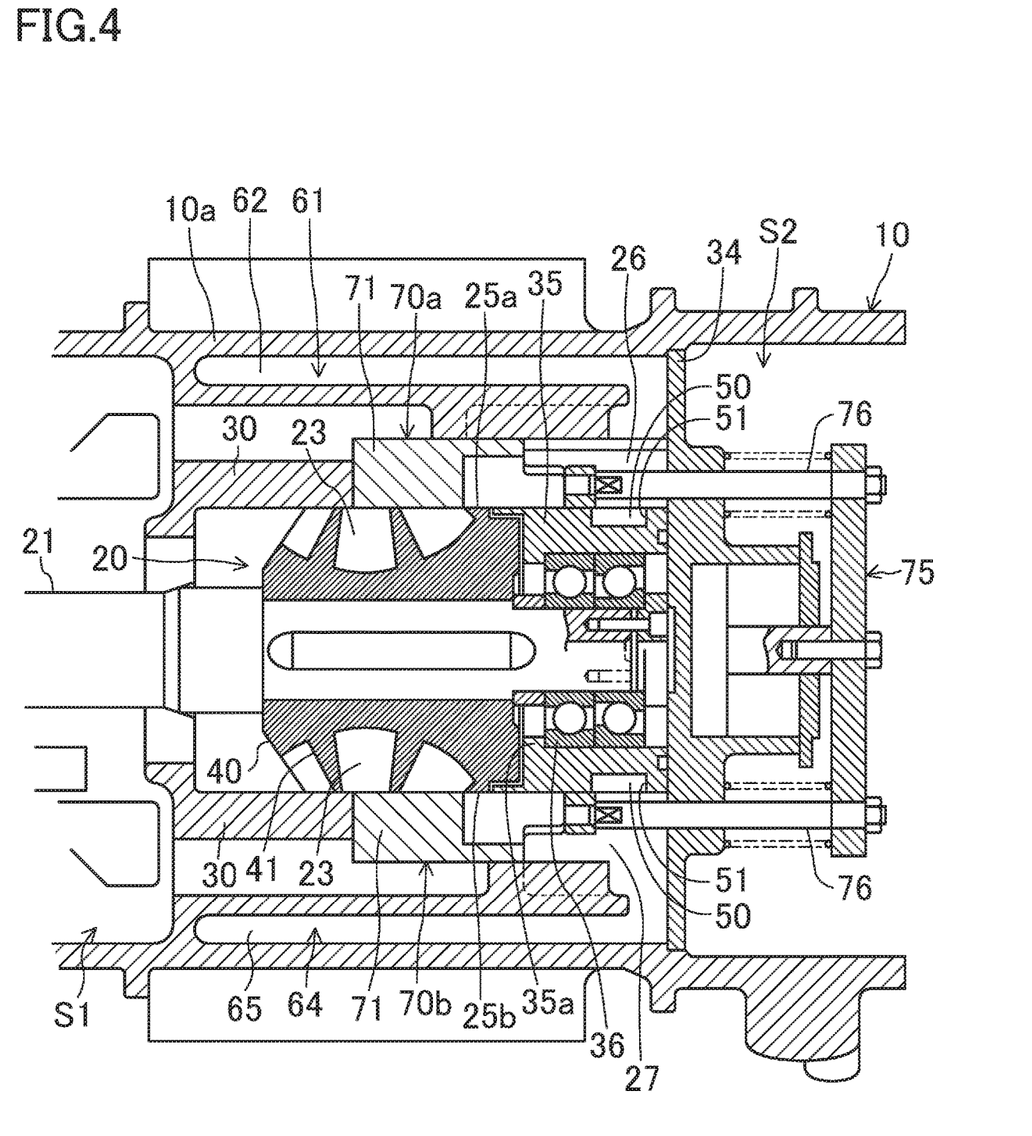
FIG. 4 is a cross-sectional view of a main part of the single-screw compressor, taken along line C-C of FIG. 2.

As illustrated in FIGS. 3 and 4, the casing (10) is provided with a bearing fixing plate (34) which is a partition wall. The bearing fixing plate (34) is substantially disk-shaped, and is disposed so as to cover an opening end (closer to the high-pressure space (S2)) of the cylinder (30). The bearing fixing plate (34) crosses the internal space of the casing (10).

Figure 5:
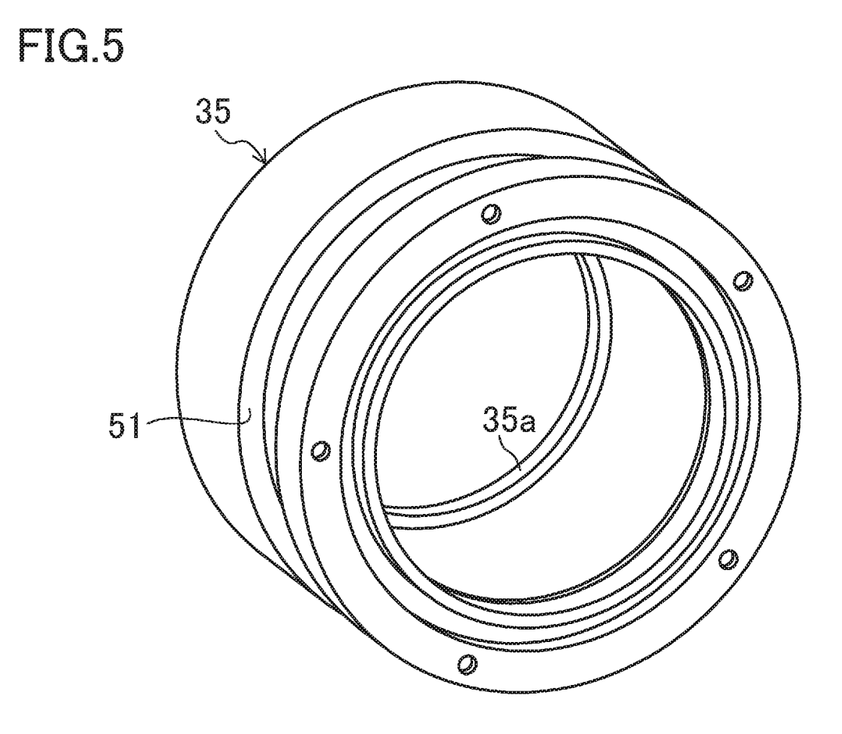
FIG. 5 is a schematic perspective view of a bearing holder according to the first embodiment.
Figure 6:
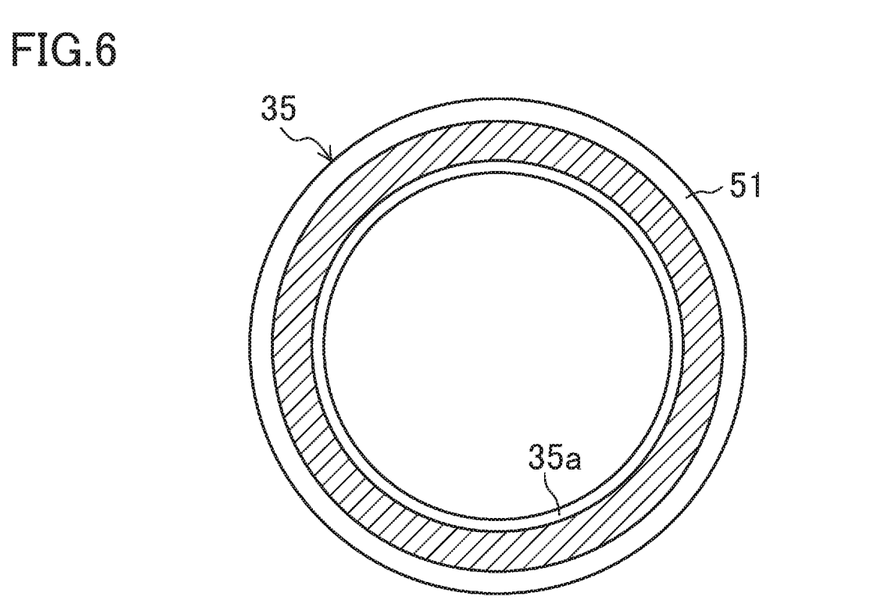
FIG. 6 is a cross-sectional view of the bearing holder according to the first embodiment.

The bearing holder (35) is a member holding a ball bearing (36). As illustrated in FIGS. 5 and 6, the bearing holder (35) is formed in a relatively thick cylindrical shape. As illustrated in FIGS. 3 and 4, the ball bearing (36) for supporting the drive shaft (21) is fitted into the bearing holder (35).

The bearing holder (35) is provided with a circumferential protrusion (35a) and a recessed groove (51). The circumferential protruding portion (35a) is a portion for positioning the ball bearing (36), and is disposed at one end (closer to the screw rotor (40)) of the bearing holder (35). The circumferential protrusion (35a) protrudes inward from the inner peripheral surface of the bearing holder (35), and is formed over the entire periphery of the inner peripheral surface of the bearing holder (35). The recessed groove (51) is a groove which opens to the outer peripheral surface of the bearing holder (35), and is formed over the entire periphery of the bearing holder (35). The recessed groove (51) is formed slightly closer to the other end (away from the screw rotor (40)) of the bearing holder (35) than to the center in the axial direction of the bearing holder (35). The width and the depth of the recessed groove (51) are constant over the entire length.

As illustrated in FIGS. 3 and 4, the bearing holder (35) is fastened to the bearing fixing plate (34) with bolts (not illustrated), and is fitted into the end (closer to the high pressure space S2) of the cylinder (30). The outer diameter of the bearing holder (35) is slightly smaller than the inner diameter of the cylinder (30). With the bearing holder (35) fitted into the cylinder (30), a gap with about several tens of micrometers is formed between the outer peripheral surface of the bearing holder (35) and the inner peripheral surface of the cylinder (30). The gap between the bearing holder (35) and the cylinder (30) is so narrow that the gap is substantially sealed. The recessed groove (51) of the bearing holder (35) forms a muffler space (50) surrounded by the bearing holder (35) and the cylinder (30).

Figure 7:
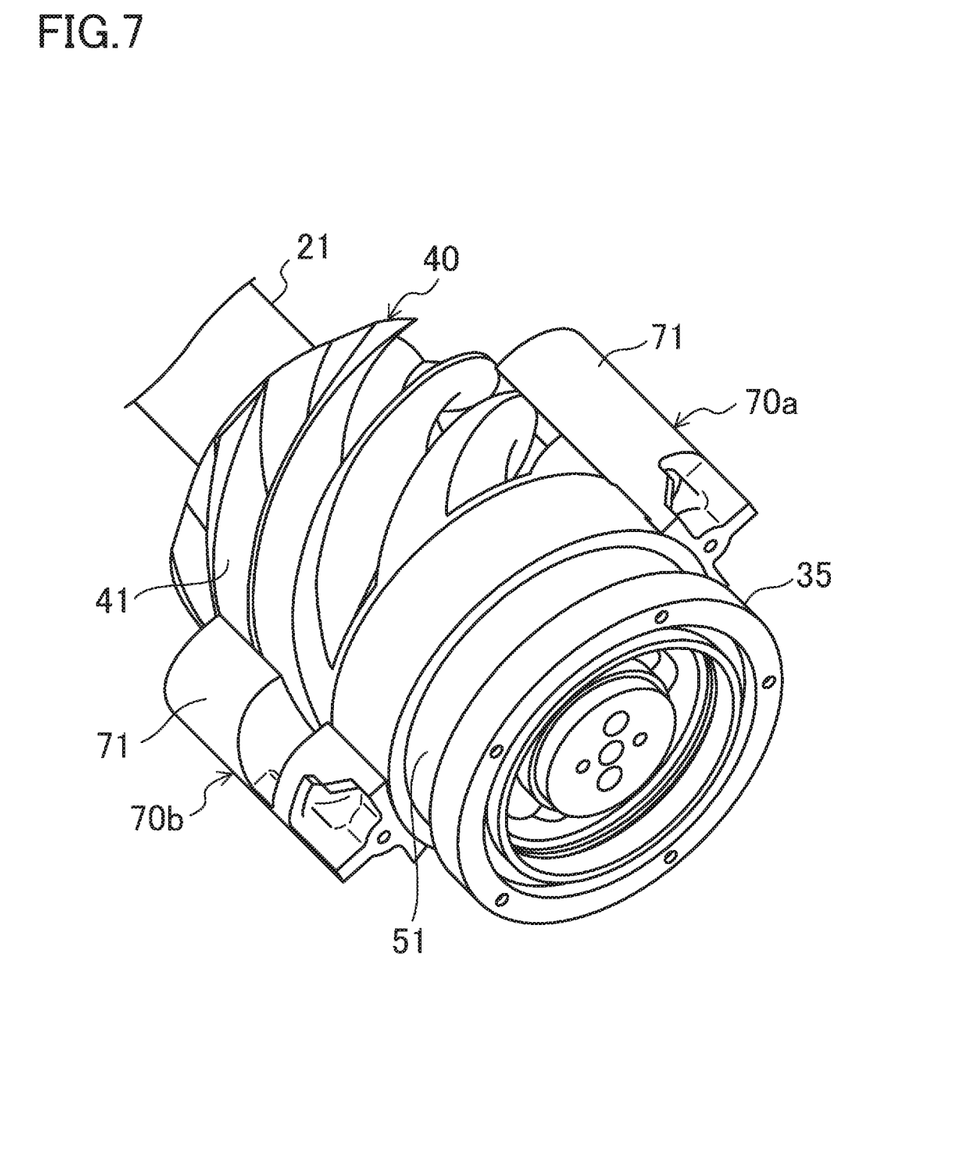
FIG. 7 is a perspective view of a screw rotor and a slide valve which are extracted from the screw compressor according to the first embodiment.

As illustrated in FIGS. 3, 4, and 7, the screw rotor (40) is a metal member having a generally cylindrical shape. The screw rotor (40) is rotatably fitted into the cylinder (30), and its outer peripheral surface is in sliding contact with the inner peripheral surface of the cylinder (30). On the outer periphery of the screw rotor (40), an odd number (seven in this embodiment) of helical grooves (41) are formed. Each helical groove (41) extends helically from one end to the other end of the screw rotor (40). Each helical groove (41) of the screw rotor (40) has an end closer to the low pressure space (S1) as a starting end and an end closer to the high pressure space (S2) as a terminal end.

Each gate rotor (45, 46) is a resin member. Although not illustrated, each gate rotor (45, 46) has a plurality of gates (eleven gates in this embodiment) formed in a rectangular plate shape and arranged radially.

The gate rotors (45, 46) are attached to a rotor support member (47) made of metal. The rotor support member (47) to which the gate rotors (45, 46) are attached is housed in a gate rotor chamber (7) adjacent to the cylinder (30) (see FIG. 2). Each gate rotor (45, 46) is disposed such that the gates mesh with the helical grooves (41) of the screw rotor (40).

Each gate rotor (45, 46) is arranged outside the cylinder (30) and axisymmetrically with respect to the rotational axis of the screw rotor (40). That is to say, in the screw compressor (1) according to this embodiment, the plurality of gate rotors (45, 46) are disposed in the circumferential direction of the screw rotor (40) at equal angular intervals. As described above, the screw compressor (1) according to this embodiment includes the two gate rotors (45, 46). Therefore, in the screw compressor (1), the two gate rotors (45, 46) are arranged at intervals of 180° in the circumferential direction of the screw rotor (40).

In the compression mechanism (20), a space surrounded by the inner peripheral surface of the cylinder (30), the helical grooves (41) of the gate rotors (40), and the gates of the gate rotors (45, 46) constitutes fluid chambers (23). If the screw rotor (40) rotates, the gates of the gate rotors (45, 46) relatively move from the starting ends of the helical groove (41) to the terminal ends of the helical groove (41), thereby changing volumes of the fluid chambers (23). As a result, the refrigerant in the fluid chambers (23) is compressed.

Figure 2:
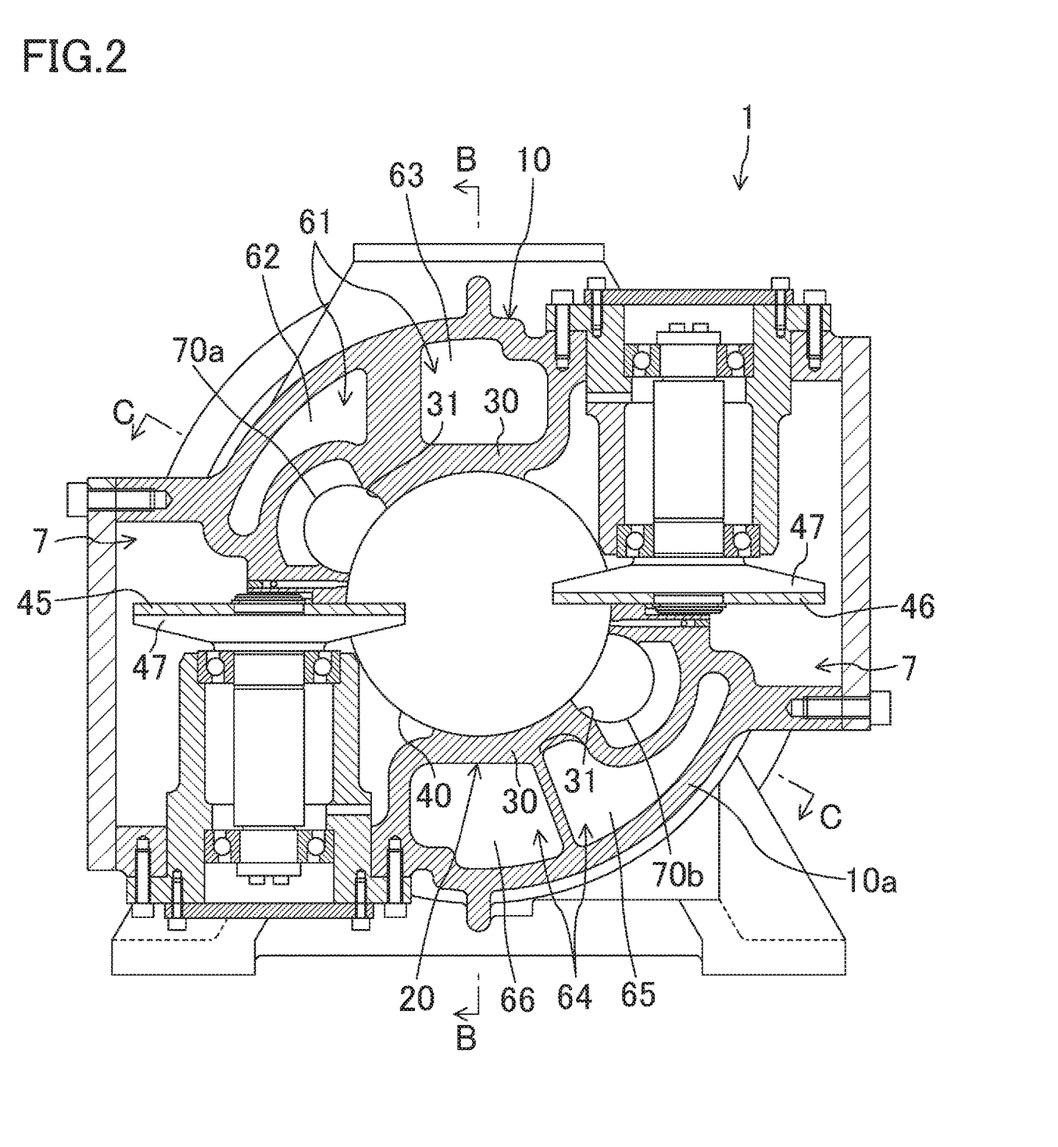
FIG. 2 is a cross-sectional view of the single-screw compressor, taken along line A-A of FIG. 1.

As illustrated in FIGS. 2 and 4, the screw compressor (1) is provided with the slide valves (70a, 70b) for adjusting the capacity, and the slide valves (70a, 70b) are respectively associated with the respective gate rotors (45, 46). That is to say, the screw compressor (1) are provided with the slide valves (70a, 70b) equal in number (two in this embodiment) to the gate rotors (45, 46).

The slide valves (70a, 70b) are attached to the cylinder (30). The cylinder (30) is provided with an opening (31) extending axially. The slide valves (70a, 70b) are arranged such that a valve body (71) of each of the slide valves (70a, 70b) fits into the opening (31) of the cylinder (30). The front face of the valve body (71) faces the peripheral surface of the screw rotor (40). The slide valves (70a, 70b) are slidable along the center axis of the cylinder (30). The opening (31) of the cylinder (30) has a portion closer to the bearing holder (35) than to the valve body (71) of each of the slide valves (70a, 70b), and the portion serves as discharge ports (25a, 25b) through which the compressed refrigerant is derived from the fluid chamber (23).

The slide valves (70a, 70b) are connected to a rod (76) of a slide valve driving mechanism (75). The slide valve driving mechanism (75) is a mechanism configured to drive each slide valve (70a, 70b) to move the slide valve (70a, 70b) along the center axis of the cylinder (30). Each slide valve (70a, 70b) is driven by the slide valve driving mechanism (75), and reciprocates along the axis of the slide valve (70a, 70b).

Each slide valve (70a, 70b) contacts the outer peripheral surface of the bearing holder (35), thereby regulating rotation of the slide valve (70a, 70b) around its center axis. The recessed groove (51) of the bearing holder (35) is formed at a position so as to communicate with the discharge passages (26, 27) even in a situation where the slide valves (70a, 70b) are closest to the high-pressure space (S2). That is to say, if the slide valves (70a, 70b) are closest to the high-pressure space (S2), at least a part of the recessed groove (51) of the bearing holder (35) is located closer to the high-pressure space (S2) than an end of the slide valves (70a, 70b) adjacent to the high-pressure space (S2) is.

<Refrigerant Flowing Passage at High-Pressure Side>

As illustrated in FIG. 4, the casing (10) is provided with the discharge passages (26, 27). The discharge passages (26, 27) are formed one-by-one so as to be respectively associated with the respective slide valves (70a, 70b). As described above, the slide valves (70a, 70b) are formed one-by-one so as to be respectively associated with the respective gate rotors (45, 46). Accordingly, in the screw compressor (1) according to this embodiment, the discharge passages (26, 27) are formed one-by-one so as to be respectively associated with the gate rotors (45, 46).

The first discharge passage (26) is associated with the upper slide valve (70a) in FIG. 4. This first discharge passage (26) includes a portion of the opening (31) of the cylinder (30) between the valve body (71) and bearing fixing plate (34), and communicates with the discharge port (25a) associated with the slide valve (70a). On the other hand, the second discharge passage (27) is associated with the lower slide valve (70b) in FIG. 4. This second discharge passage (27) includes a portion of the opening (31) of the cylinder (30) between the valve body (71) and bearing fixing plate (34), and communicates with the discharge port (25b) associated with the slide valve (70b).

A high-pressure refrigerant that has been discharged from the fluid chamber (23) flows into each discharge passage (26, 27) through an associated one of the discharge ports (25a, 25b). As illustrated in FIG. 4, each discharge passage (26, 27) communicates with one muffler space (50) configured as the recessed groove (51) of the bearing holder (35). That is to say, the first discharge passage (26) and the second discharge passage (27) communicate with each other through one muffler space (50).

The casing (10) is provided with high-pressure fluid passages (61, 64) that are formed one-by-one so as to be respectively associated with the discharge passages (26, 27), the high-pressure fluid passages (61, 64) heating the cylinder (30) using the high-pressure refrigerant. The first high-pressure fluid passage (61) is associated with the first discharge passage (26), and the second high-pressure fluid passage (64) is associated with the second discharge passage (27).

As illustrated in FIG. 2, the first high-pressure fluid passage (61) is formed in an upper portion of the casing (10), and the second high-pressure fluid passage (64) is formed in a lower portion of the casing (10). The high-pressure fluid passages (61, 64) include forward portions (62, 65) extending from a side closer to the bearing fixing plate (34) toward the low-pressure space (S1), and returning portions (63, 66) extending from a side closer to the low-pressure space (S1) toward the bearing fixing plate (34). In the first high-pressure fluid passage (61), the forward portion (62) is disposed above the rear surface of the upper slide valve (70a), and the returning portion (63) is disposed above the cylinder (30). In the second high-pressure fluid passage (64), the forward portion (65) is disposed below the rear surface of the lower slide valve (70b), and the returning portion (66) is disposed below the cylinder (30).

As illustrated in FIGS. 3 and 4, in the first high-pressure fluid passage (61), the forward portion (62) has one end communicating with the first discharge passage (26), and the other end communicating with one end of the returning portion (63). In the second high-pressure fluid passage (64), the forward portion (65) has one end communicating with the second discharge passage (27), and the other end communicating with one end of the returning portion (66). The returning portions (63, 66) of the high-pressure fluid passages (61, 64) each have the other end communicating with the high-pressure space (S2).

<Operation of Screw Compressor>

It will be described how the screw compressor (1) is operated.

When the electric motor (15) is caused to conduct, the screw rotor (40) is driven by the electric motor (15) and rotates. When the screw rotor (40) rotates, the gate rotor (45, 46) also rotates, thereby allowing the compression mechanism (20) to compress the refrigerant.

The low-pressure refrigerant that has flowed from the evaporator passes through the inlet (11) to be drawn into the low-pressure space (S1) of the casing (10). The refrigerant in the low-pressure space (S1) is drawn into the fluid chambers (23) of the compression mechanism (20). After the screw rotor (40) rotates, and the fluid chambers (23) are separated from the low-pressure space (S1), i.e., are fully closed, the refrigerant in the fluid chambers (23) is compressed.

If the fluid chambers (23) communicate with the discharge ports (25a, 25b), the compressed refrigerant passes through the discharge ports (25a, 25b) and flows out of the fluid chamber (23). The high-pressure refrigerant that has passed through the discharge port (25a) associated with the upper slide valve (70a) flows into the first discharge passage (26). The high-pressure refrigerant that has flowed into the first discharge passage (26) sequentially passes through the forward portion (62) and the returning portion (63) in the first high-pressure fluid passage (61), and then, flows into the high-pressure space (S2). The high-pressure refrigerant that has passed through the discharge port (25b) associated with the lower slide valve (70b) flows into the second discharge passage (27). The high-pressure refrigerant that has flowed into the second discharge passage (27) sequentially passes through the forward portion (65) and the returning portion (66) in the second high-pressure fluid passage (64), and then, flows into the high-pressure space (S2).

The high-pressure refrigerant that has flowed into the high-pressure space (S2) from the respective discharge passages (26, 27) passes through the oil separator (18). In the oil separator (18), oil-droplet-shaped, refrigerating machine oil that has flowed together with the high-pressure refrigerant is separated from the high pressure refrigerant. The high-pressure refrigerant that has passed through the oil separator (18) passes through the outlet (12) and flows out of the casing (10). The high-pressure gas refrigerant that has been discharged from the outlet (12) flows toward the condenser.

<Reduction in Pressure Fluctuation Using Muffler Space>

When the screw rotor (40) rotates, the fluid chambers (23) defined by the helical grooves (41) of the screw rotor (40) sequentially communicate with the respective discharge ports (25a, 25b). The high-pressure refrigerant is continuously discharged from the respective discharge ports (25a, 25b) whenever the fluid chambers (23) communicate with the discharge ports (25a, 25b). Therefore, the pressures of the discharge passages (26, 27) communicating with the respective discharge ports (25a, 25b) fluctuate periodically.

Figure 8:
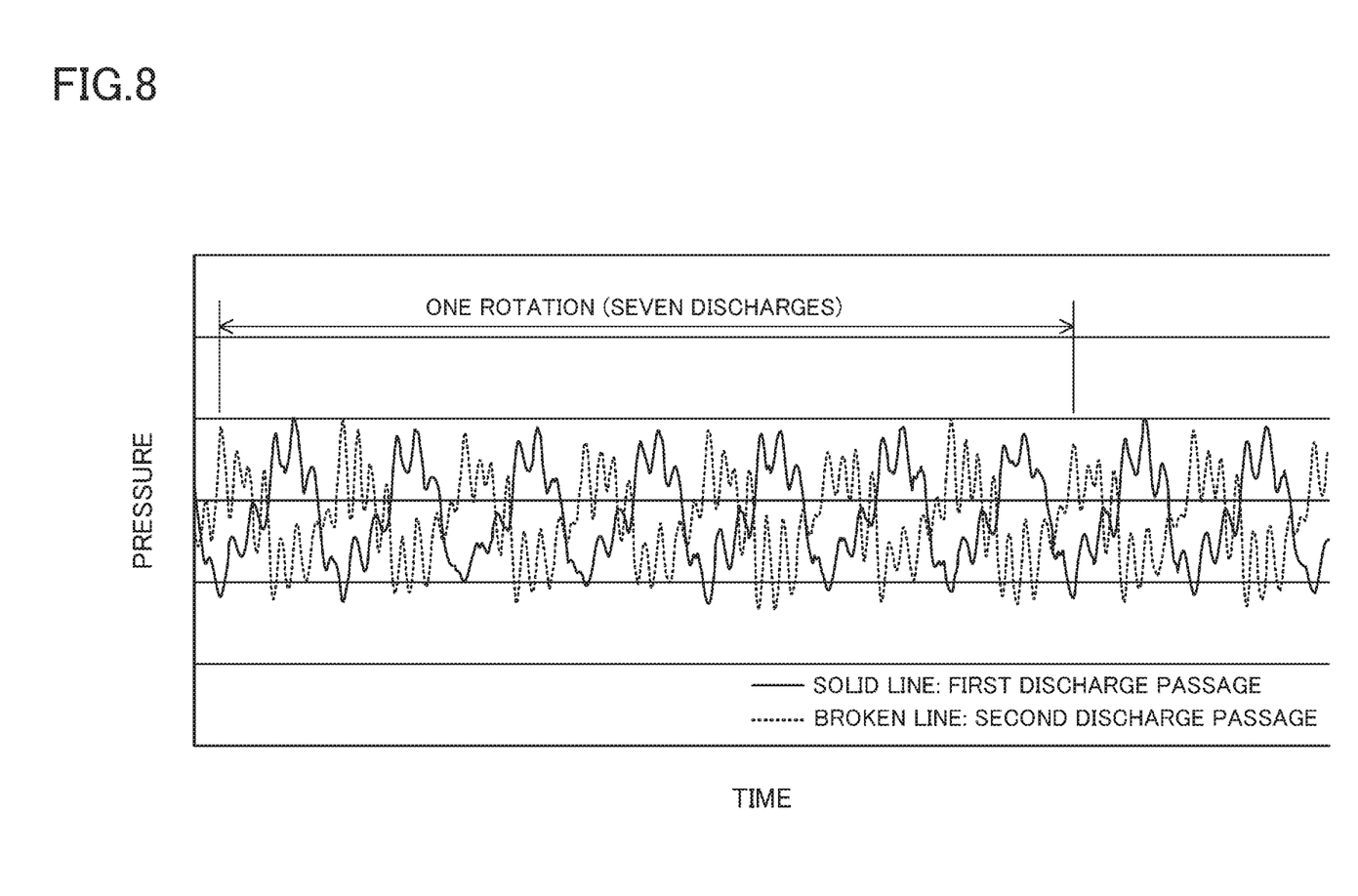
FIG. 8 is a graph indicating a pressure fluctuation of a refrigerant in a discharge passage of the single-screw compressor according to the first embodiment.

The screw rotor (40) according to the embodiment is provided with seven helical grooves (41). Therefore, during one rotation of the screw rotor (40), the high-pressure refrigerant is discharged from the respective discharge ports (25a, 25b) seven times. Therefore, as illustrated in FIG. 8, the pressure of the refrigerant in the discharge passages (26, 27) fluctuates periodically, i.e., seven times, during one rotation of the screw rotor (40).

In the screw compressor (1) according to the embodiment, the two gate rotors (45, 46) are disposed in the screw rotor (40) at intervals of 180°. Therefore, as illustrated in FIG. 8, the pressure fluctuation of the refrigerant in the first discharge passage (26) (see the solid line of FIG. 8) is shifted from the pressure fluctuation of the refrigerant in the second discharge passage (27) (see the broken line of FIG. 8) by a half-cycle.

In the screw compressor (1) according to this embodiment, the first discharge passage (26) communicates with the second discharge passage (27) through the muffler space (50), and the pressure fluctuations of the refrigerant in the first and second discharge passages (26, 27) interfere with each other. As a result, the pressure fluctuations of the refrigerant in the first and second discharge passages (26, 27) cancel each other, thereby reducing the pressure fluctuations of the refrigerant in the first and second discharge passages (26, 27).

Advantages of First Embodiment

In the screw compressor (1) according this embodiment, the casing (10) is provided with the muffler space (50), thereby reducing the pressure fluctuations of the refrigerant flowing into the high-pressure fluid passages (61, 64). Therefore, this can reduce vibration of the main body (10a) of the casing (10) due to the pressure fluctuation of the refrigerant, and further reduce noise generated due to the operation of the screw compressor (1).

According to this embodiment, the screw compressor (1) is provided with the two gate rotors (45, 46), and the screw rotor (40) is provided with odd number of helical grooves (41). Therefore, the waveforms of the pressure fluctuations of the refrigerant in the first and second discharge passages (26, 27) are shifted from each other by a substantially half-wavelength. In this embodiment, the first discharge passage (26) and the second discharge passage (27) communicate with one muffler space (50). Therefore, according to the embodiment, the pressure fluctuations of the refrigerant in the first and second discharge passages (26, 27) cancel each other. This can reliably reduce the pressure fluctuations of a fluid flowing from the respective discharge passages (26, 27) to the high-pressure fluid passages (61, 64).

Also, in this embodiment, the muffler space (50) is defined by the cylinder (30) and the bearing holder (35) which are conventionally provided to the screw compressor (1). Thus, according to the embodiment, the muffler space (50) is provided to the casing (10) without adding a new member to the screw compressor (1).

According to this embodiment, the recessed groove (51) of the bearing holder (35) constituting the muffler space (50) has a constant width and a constant depth over the entire length. This makes it easy to form the recessed groove (51) in the bearing holder (35), thereby reducing an increase in cost for manufacturing the recessed groove (51) in the bearing holder (35).

Second Embodiment

A second embodiment will be described. Here, it will be described how the screw compressor (1) in this embodiment is different from that in the first embodiment.

Figure 9:
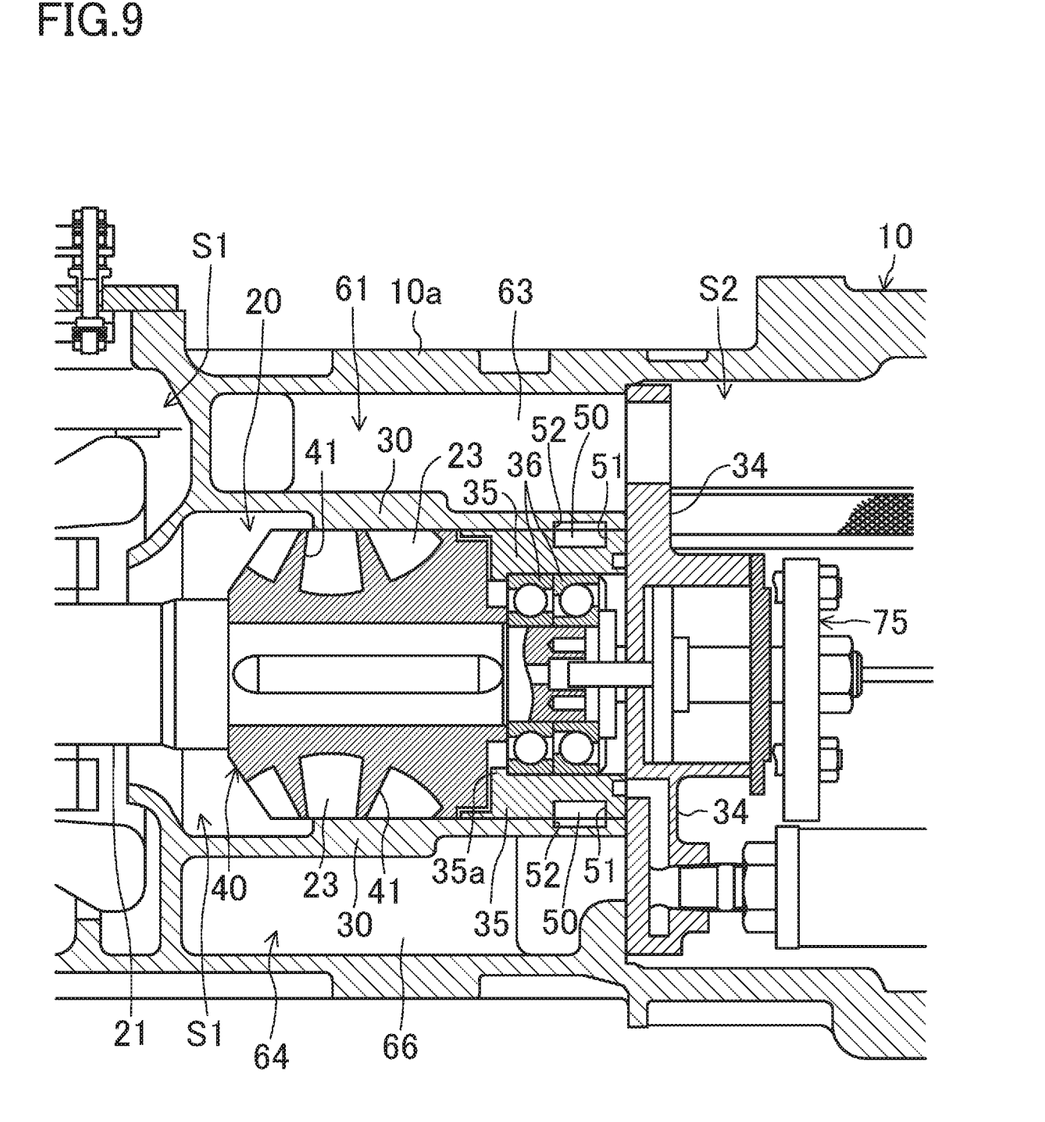
FIG. 9 is a cross-sectional view of a single-screw compressor according to a second embodiment and corresponds to FIG. 3.
Figure 10:
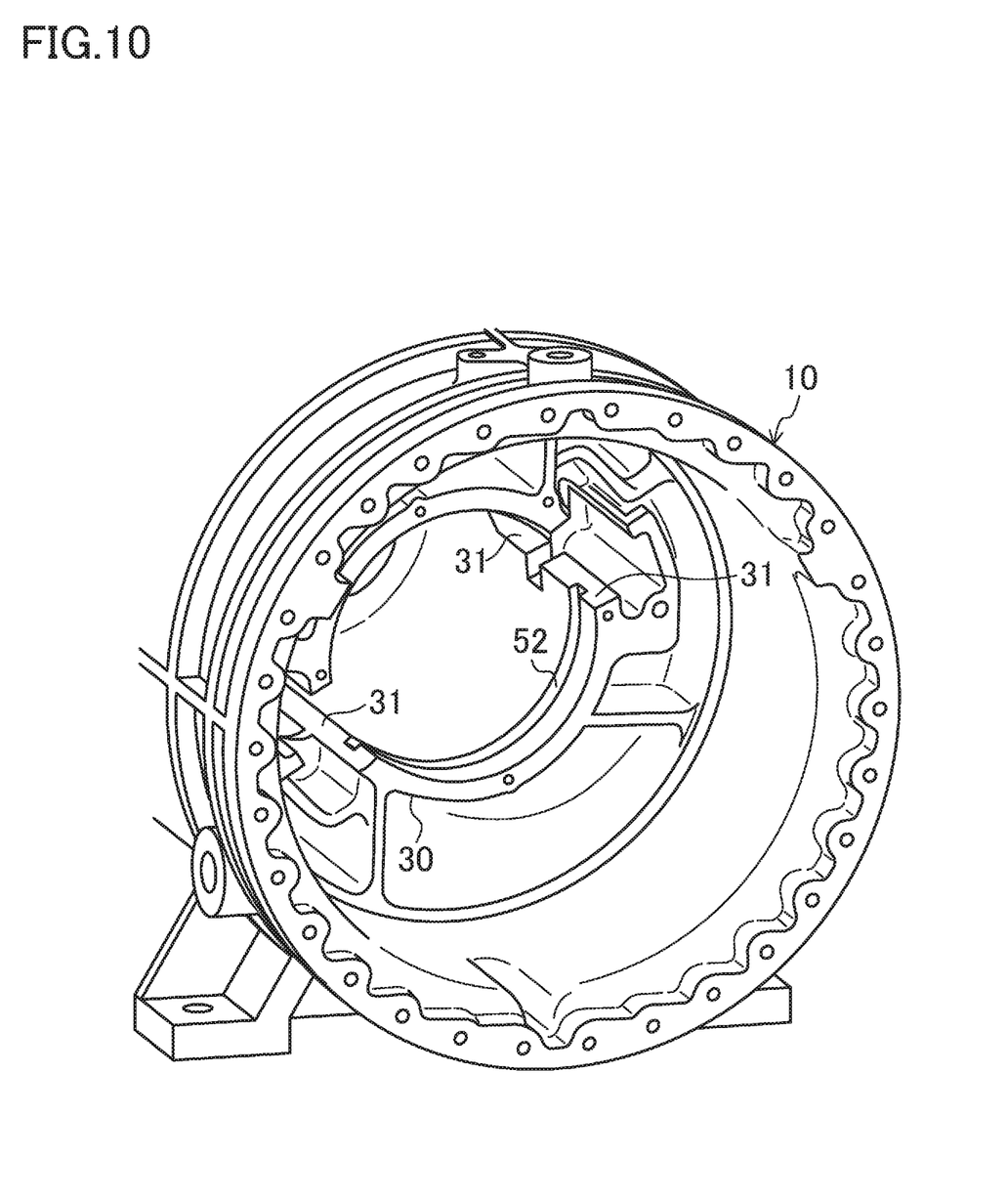
FIG. 10 is a schematic perspective view of a main part of the casing according to the second embodiment.

As illustrated in FIGS. 9 and 10, in the screw compressor (1) according to this embodiment, a recessed groove (52) is formed in the inner peripheral surface of the cylinder (30). This recessed groove (52) is a groove extending circumferentially along the inner peripheral surface of the cylinder (30), and faces the recessed groove (51) of the bearing holder (35). The width and the depth of the recessed groove (52) are constant over the entire length. The width of the recessed groove (52) of the cylinder (30) is substantially the same as that of the recessed groove (51) of the bearing holder (35). In the screw compressor (1) according to this embodiment, the recessed groove (51) of the bearing holder (35) and the recessed groove (52) of the cylinder (30) constitute the muffler space (50).

According to this embodiment, the volume of the muffler space (50) can be enlarged, as compared with the first embodiment. As a result, the effect of reducing the pressure fluctuation of the refrigerant by the muffler space (50) can be enhanced.

Other Embodiments

First Variation

Figure 11:
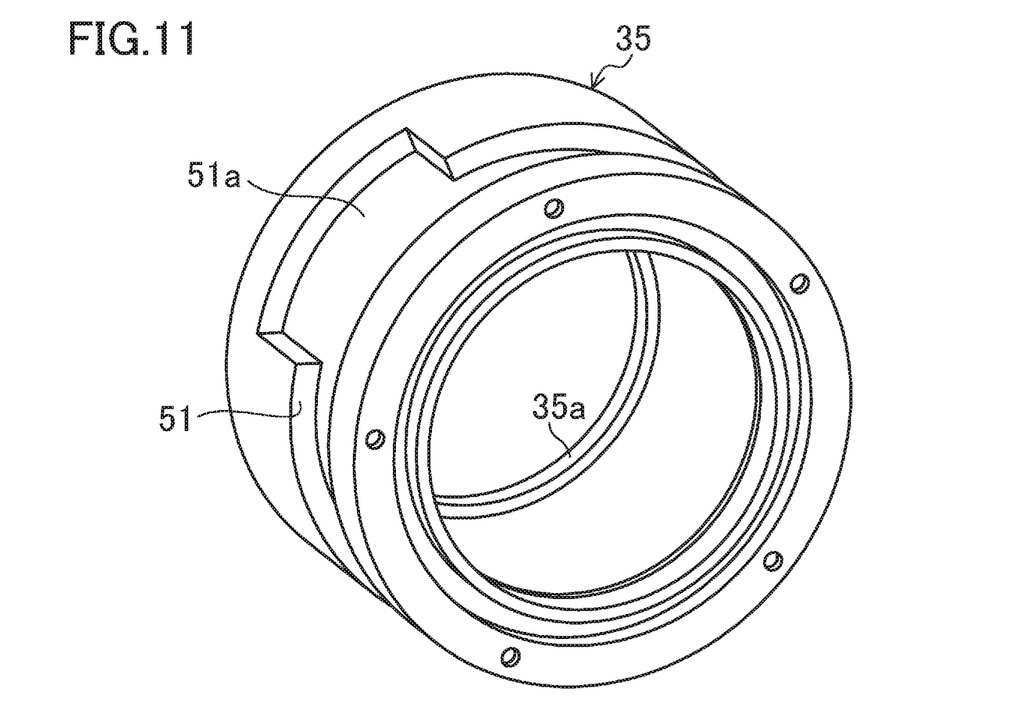
FIG. 11 is a schematic perspective view of a bearing holder according to a first variation of other embodiments.

The muffler space (50) in each embodiment does not need to have a constant width. Here, a case will be described where this variation is applied to the screw compressor (1) according to the first embodiment As illustrated in FIG. 11, according to this variation, the recessed groove (51) formed in the bearing holder (35) includes an enlarged portion (51a) having a wider width than the rest portion. The enlarged portion (51a) is formed along the recessed groove (51) in the circumferential direction of the recessed groove (51). Therefore, the muffler space (50) formed by the recessed groove (51) has a steeply expanded portion in the circumferential direction of the recessed groove (51). As a result, reduction in the pressure fluctuation due to the change of the width of the muffler space (50) can be obtained, too, thereby further reducing the pressure fluctuations of the refrigerant in the discharge passages (26, 27).

Second Variation

The muffler space (50) in each embodiment may be formed so as to be associated with each of the discharge passages (26, 27). Here, a case will be described where this variation is applied to the screw compressor (1) according to the first embodiment.

Figure 12:
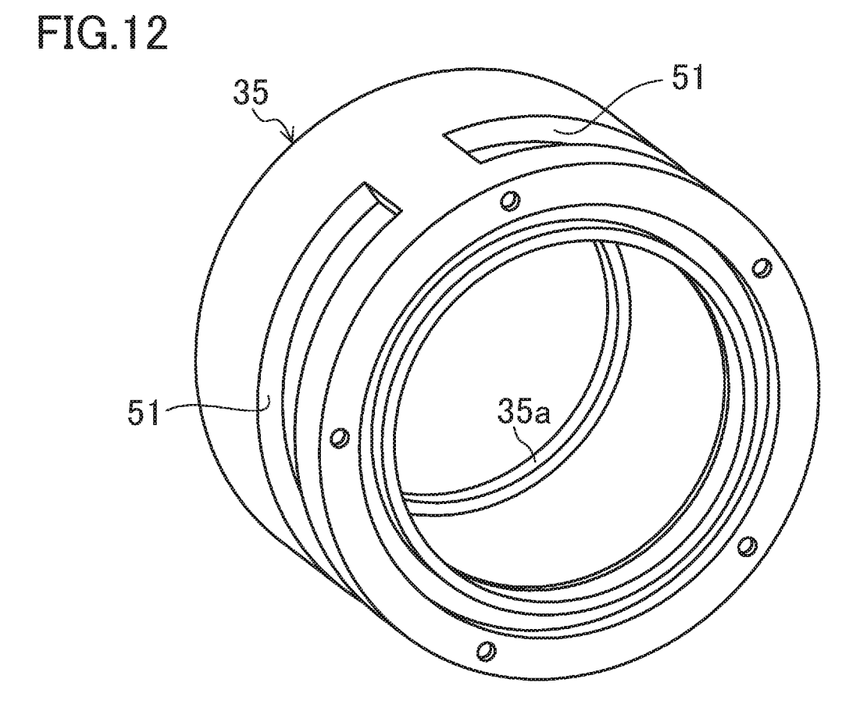
FIG. 12 is a schematic perspective view of a bearing holder according to a second variation of other embodiments.
Figure 13:
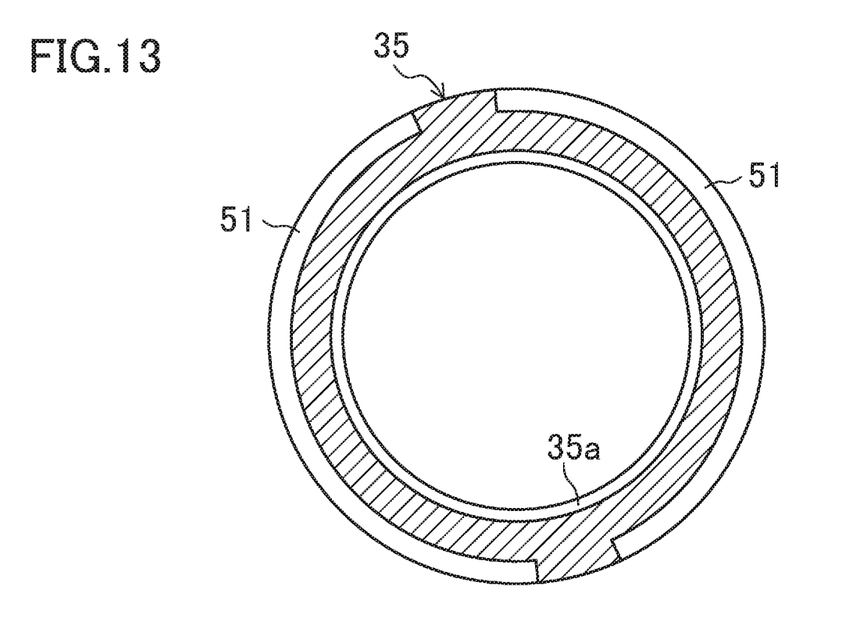
FIG. 13 is a cross-sectional view of the bearing holder according to the second variation of other embodiments.

As illustrated in FIGS. 12 and 13, two recessed grooves (51) are formed in the bearing holder (35) according to this variation. The two recessed grooves (51) are arranged in the circumferential direction of the bearing holder (35). Each of the two recessed grooves (51) constitutes the muffler space (50). That is to say, the screw compressor (1) according to this variation has two muffler spaces (50). One of the two muffler spaces (50) communicates with the first discharge passage (26), and the other communicates with the second discharge passage (27). In the screw compressor (1) according to this variation, each of the muffler spaces (50) serves as a side branch with respect an associated one of the discharge passages (26, 27), thereby constituting a so-called interference silencer.

Third Variation

The screw rotor (40) in each embodiment may be provided with even number (for example, six) of the helical grooves (41).

INDUSTRIAL APPLICABILITY

As can be seen from the foregoing description, the present invention is useful for a screw compressor in which a high-pressure fluid passage is disposed outside the cylinder (30) housing a screw rotor.

What is claimed is:

1. A screw compressor, comprising:
a casing including a cylindrically-shaped cylinder, a main body surrounding a vicinity of the cylinder, and a high-pressure fluid passage provided between the main body and the cylinder; and
a screw rotor including a plurality of helical grooves, the screw rotor being inserted into the cylinder to define fluid chambers, and a fluid being sucked into the fluid chambers to compress the fluid in the screw compressor;
a discharge passage disposed in the casing, the discharge passage guiding the fluid that has been discharged from the fluid chambers to the high-pressure fluid passage; and
at least one muffler space disposed in the casing, the at least one muffler space communicating with the discharge passage so as to reduce a pressure fluctuation of the fluid flowing from the discharge passage to the high-pressure fluid passage,
the casing including a cylindrically-shaped bearing holder holding a bearing, the bearing supporting a drive shaft of the screw rotor,
the bearing holder being fitted into an end of the cylinder, and the bearing holder having an outer peripheral surface facing an inner peripheral surface of the cylinder, and
the at least one muffler space being configured as a recessed groove extending circumferentially along the bearing holder and being formed in at least one of
the outer peripheral surface of the bearing holder,
a portion of the inner peripheral surface of the cylinder, the portion facing the bearing holder, and
the recessed groove constituting the at least one muffler space being formed over an entire periphery of the bearing holder.

2. The screw compressor of claim 1, further comprising
a plurality of gate rotors meshing with the respective plurality of helical grooves of the screw rotor,
the discharge passage including a plurality of discharge passages, the discharge passages being disposed in the casing, and the discharge passages being formed so as to be respectively associated with the gate rotors, and
all of the discharge passages communicating with a single one the same muffler space of the at least one muffler space.

3. The screw compressor of claim 2, wherein
the plurality of gate rotors include two gate rotors, and
the plurality of helical grooves include an odd number of helical grooves, and the odd number of helical grooves are formed in the screw rotor.

4. A screw compressor, comprising:
a casing including a cylindrically-shaped cylinder, a main body surrounding a vicinity of the cylinder, and a high-pressure fluid passage provided between the main body and the cylinder; and
a screw rotor including a plurality of helical grooves, the screw rotor being inserted into the cylinder to define fluid chambers, and a fluid being sucked into the fluid chambers to compress the fluid in the screw compressor;
a plurality of gate rotors meshing with the respective plurality of helical grooves of the screw rotor,
a plurality of discharge passages disposed in the casing, the plurality of discharge passages guiding the fluid that has been discharged from the fluid chambers to the high-pressure fluid passage, and being equal in number to the gate rotors;
a single muffler space disposed in the casing, the single muffler space communicating with the plurality of discharge passages so as to reduce a pressure fluctuation of the fluid flowing from the plurality of discharge passages to the high-pressure fluid passage; and
the single muffler space being fluidly connected to all of the plurality of discharge passages.

5. The screw compressor of claim 4, wherein
the plurality of gate rotors include two gate rotors, and
the plurality of helical grooves include an odd number of helical grooves, and the odd number of helical grooves are formed in the screw rotor.

* * * * *